United States Patent
Tang et al.

(10) Patent No.: US 12,321,727 B2
(45) Date of Patent: Jun. 3, 2025

(54) DATA INTERACTION METHOD, APPARATUS AND SYSTEM FOR AI INFERENCE DEVICE AND AUTOMATION CONTROLLER

(71) Applicant: Siemens Aktiengesellschaft, Munich (DE)

(72) Inventors: Li San Tang, Shanghai (CN); Fei Huang Hu, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 12 days.

(21) Appl. No.: 18/564,120

(22) PCT Filed: May 25, 2021

(86) PCT No.: PCT/CN2021/095804
§ 371 (c)(1),
(2) Date: Nov. 27, 2023

(87) PCT Pub. No.: WO2022/246647
PCT Pub. Date: Dec. 1, 2022

(65) Prior Publication Data
US 2024/0272883 A1    Aug. 15, 2024

(51) Int. Cl.
*G06F 8/40* (2018.01)
*G05B 19/05* (2006.01)

(52) U.S. Cl.
CPC ............ *G06F 8/40* (2013.01); *G05B 19/056* (2013.01)

(58) Field of Classification Search
CPC ................................ G05B 19/056; G06F 8/40
See application file for complete search history.

(56) References Cited

U.S. PATENT DOCUMENTS

| 12,079,737 | B1* | 9/2024 | Biswas | ............... G06F 16/26 |
| 2017/0017221 | A1 | 1/2017 | Lamparter | ............ G05B 19/056 |

(Continued)

FOREIGN PATENT DOCUMENTS

| CN | 111 108 452 | 5/2020 | ............. G05B 19/05 |
| CN | 112 424 713 | 2/2021 | ............ G05B 19/418 |

(Continued)

OTHER PUBLICATIONS

NPL_Nerve Logic Controller_Translated version of CN 112513887 B (Year: 2024).*

(Continued)

*Primary Examiner* — Ziaul A Chowdhury
(74) *Attorney, Agent, or Firm* — Slayden Grubert Beard PLLC

(57) ABSTRACT

The teachings of the present disclosure include data interaction methods, apparatus, and systems for an Artificial Intelligence (AI) inference device and an automation controller. An example method includes: S1: analyzing a topological structure of an AI model, and acquiring multiple nodes of the AI model and interconnections of the multiple nodes; S2: matching an output node of the AI model based on a user input, determining a format of an inference result based on the AI model, and mapping the format of the inference result to the automation controller; and S3: matching a communication protocol for performing data interaction by the AI inference device and the automation controller based on the user input.

18 Claims, 3 Drawing Sheets

(56) References Cited

U.S. PATENT DOCUMENTS

| | | | | |
|---|---|---|---|---|
| 2018/0293517 A1* | 10/2018 | Browne | ............... | G06F 8/437 |
| 2020/0278653 A1 | 9/2020 | Hu | ............... | G05B 19/05 |
| 2021/0150359 A1 | 5/2021 | Canedo | ............... | G06N 3/08 |
| 2021/0181695 A1 | 6/2021 | Feng | ............... | G05B 13/0265 |
| 2022/0137583 A1* | 5/2022 | Lovegrove | ............... | G06N 3/084 |
| | | | | 700/48 |

FOREIGN PATENT DOCUMENTS

| | | | | |
|---|---|---|---|---|
| CN | 112 513 887 | | 3/2021 | ............... G06N 3/10 |
| CN | 112513887 B | * | 10/2024 | ............... G05B 19/05 |
| WO | 2020 127895 | | 6/2020 | ............... G06N 3/063 |

OTHER PUBLICATIONS

Search Report for International Application No. PCT/CN2021/095804, 8 pages, Feb. 23, 2022.

Anonymous, "Chapter 16: Artificial Intelligence and PLC Systems," UNIVASF Universidade Federal do São, URL: http://www.univasf.edu.br/~joseamerico.moura/pag_autom_arquivos/ARTIFICIAL_INTELIGENCE.pdf, 24 pages.

Extended European Search Report, Application No. 21942234.2, 14 pages.

\* cited by examiner

DATA INTERACTION METHOD, APPARATUS AND SYSTEM FOR AI INFERENCE DEVICE AND AUTOMATION CONTROLLER

CROSS-REFERENCE TO RELATED APPLICATIONS

This application is a U.S. National Stage Application of International Application No. PCT/CN2021/095804 filed May 25, 2021, which designates the United States of America, the contents of which are hereby incorporated by reference in their entirety.

TECHNICAL FIELD

The present disclosure relates to the field of automation. Various embodiments of the teachings herein include a data interaction methods, apparatus, and/or systems for an Artificial Intelligence (AI) inference device and an automation controller.

BACKGROUND

Growth of AI in the field of manufacturing is a natural branch of industrial revolution. For example, for industry, AI may be more flexible, higher in quality and efficiency and lower in cost. However, a conventional automation controller (such as a Programmable Logic Controller (PLC)) is not so suitable for AI inference and needs many floating point calculations, and thus dedicated AI inference devices enter an automation field level to support automation controllers to perform AI inference. The dedicated AI inference devices are usually based on hardware accelerators, such as a Graphics Processing Unit (GPU), a Field-Programmable Gate Array (FPGA) and an Application Specific Integrated Circuit (ASIC). Integration of shop floor connectivity with a massive installation foundation of PLCs and AI inference devices has become an important technical topic.

In order to make AI application more automated, AI engineers work together with automation engineers. Specifically, work contents include defining application-layer communication protocols for inference devices and control devices. The work contents also include investigating potential industrial communication protocols that control devices use, and based on this, AI engineers need to learn how to develop through industrial communication protocol interfaces. For example, if a control device needs to receive an inference result through PROFINET RT, an AI engineer needs to install a soft-PROFINET protocol stack and a program to call a corresponding application program interface. In addition, AI engineers and automation engineers may also develop programs for inference devices and control devices using different programming languages. For example, the AI engineers typically use Python or C++ for programming, and the automation engineers typically use IEC61131-3 Structured Control Language (SCL) for programming. Such a workflow brings interworking frequent between different development teams and more work for introduction of AI technologies to automation systems.

Generally, in an AI training process, an engineer responsible for AI training uses an open source AI framework (such as TensorFlow), and this framework requires the Python language for programming. A trained model may be obtained through this process. The trained model is verified to be trained well only through offline data in a computer of the AI engineer. However, in practice, the trained model cannot be directly run in an industrial device, or a PLC or an edge device. This is because that the edge device and the PLC are different in device type and environment and the model is required to be converted from one format to another format. Moreover, the automation engineer does not know what data is output by the model, and only the AI engineer knows the type and format of the output data. For example, the PLC runs an automated program itself and cannot directly run the AI model for a reason that an inference environment cannot be installed in the PLC if the AI model is used and thus the PLC is intended to add an additional AI function but cannot. For solving the foregoing problem, the following solution is provided in the prior art: an edge device is selected to run an AI model for a PLC, then the edge device performs inference, the edge device can provide an inference result for the PLC, and the PLC can use the inference result. This is equivalent to adding an external extension that performs inference to the PLC.

At present, Information Technology (IT) corporations often select GPUs for direct interaction with Personal Computers (PCs), and meanwhile, data interaction of automation corporations is based on AI application and usually implemented in a hard-coded manner. There is no well-designed data interaction standard solution for inference devices and PLCs.

SUMMARY

As an example, some embodiments of the present disclosure include a data interaction method for an AI inference device and an automation controller comprising: S1: analyzing a topological structure of an AI model, and acquiring multiple nodes of the AI model and interconnections of the multiple nodes; S2: matching an output node of the AI model based on a user input, determining a format of an inference result based on the AI model, and mapping the format of the inference result to the automation controller; and S3: matching a communication protocol for performing data interaction by the AI inference device and the automation controller based on the user input.

In some embodiments, the AI inference device is an edge device, and the automation controller is a PLC.

In some embodiments, step S2 further includes: matching the output node of the AI model based on the user input, determining the format of the inference result based on the AI model, and mapping the format of the inference result to an input image of the PLC.

In some embodiments, the data interaction method further includes the following executed at the AI inference device: S4: generating a first source code for the edge device based on the format of the inference result, a format of the communication protocol and a runtime environment of the inference device; S5: downloading the first source code to the AI inference device; and S6: packing the inference result using the first source code based on the format of the inference result, and sending the packed inference result to the automation controller through the matched communication protocol.

In some embodiments, the data interaction method further includes the following executed at the automation controller: S7: generating a second source code for the automation controller based on the format of the inference result, the format of the communication protocol and a runtime environment of the automation controller; S8: downloading the second source code to the automation controller; and S9:

controlling the automation controller to receive and parse the inference result to send a feedback result to the AI inference device.

In some embodiments, the data interaction method further includes the following: performing, by the AI inference device, inference on the AI model according to input data, where an inference result includes multiple pieces of output data and multiple corresponding parameters; and reading, by the automation controller, the inference result, selecting part of the output data and the corresponding parameters from the inference result, and performing association and mapping according to the selected output data and corresponding parameters.

In some embodiments, the data interaction method further includes performing translation on the AI inference device and the automation controller based on different programming languages corresponding to different communication protocols to unify types of the different programming languages.

In some embodiments, the data interaction method further includes performing program construction on the first source code and the second source code to convert the first source code and the second source code into a binary code.

As another example, some embodiments include a data interaction system for an AI inference device and an automation controller, comprising: a processor; and a memory coupled to the processor. The memory has an instruction stored therein, when the instruction is executed by the processor, an electronic device is enabled to execute operations, and the operations include: S1: analyzing a topological structure of an AI model, and acquiring multiple nodes of the AI model and interconnections of the multiple nodes; S2: matching an output node of the AI model based on a user input, determining a format of an inference result based on the AI model, and mapping the format of the inference result to the automation controller; and S3: matching a communication protocol for performing data interaction by the AI inference device and the automation controller based on the user input.

In some embodiments, the AI inference device is an edge device, and the automation controller is a PLC.

In some embodiments, the operation S2 further includes: matching the output node of the AI model based on the user input, determining the format of the inference result based on the AI model, and mapping the format of the inference result to an input image of the PLC.

In some embodiments, the operations further include: S4: generating a first source code for the edge device based on the format of the inference result, a format of the communication protocol and a runtime environment of the inference device; S5: downloading the first source code to the AI inference device; and S6: packing the inference result using the first source code based on the format of the inference result, and sending the packed inference result to the automation controller through the matched communication protocol.

In some embodiments, the operations further include: generating a second source code for the automation controller based on the format of the inference result, the format of the communication protocol and a runtime environment of the automation controller; downloading the second source code to the automation controller; and controlling the automation controller to receive and parse the inference result to send a feedback result to the AI inference device.

In some embodiments, the operations further include: performing, by the AI inference device, inference on the AI model according to input data, where an inference result includes multiple pieces of output data and multiple corresponding parameters; and reading, by the automation controller, the inference result, selecting part of the output data and the corresponding parameters from the inference result, and performing association and mapping according to the selected output data and corresponding parameters.

In some embodiments, the operations further include: performing translation on the AI inference device and the automation controller based on different programming languages corresponding to different communication protocols to unify types of the different programming languages.

In some embodiments, the operations further include: performing program construction on the first source code and the second source code to convert the first source code and the second source code into a binary code.

As another example, some embodiments include a data interaction apparatus for an AI inference device and an automation controller, which includes the following: an analysis apparatus, configured to analyze a topological structure of an AI model and acquire multiple nodes of the AI model and interconnections of the multiple nodes; a matching and mapping apparatus, configured to match an output node of the AI model based on a user input, determine a format of an inference result based on the AI model and map the format of the inference result to the automation controller; and a matching apparatus, configured to match a communication protocol for performing data interaction by the AI inference device and the automation controller based on the user input.

As another example, some embodiments include a computer program product stored on a non-transitory computer-readable medium and includes computer-executable instructions, the computer-executable instructions, when being executed, causing at least one processor to perform one or more of the methods described herein.

As another example, some embodiments include a computer-readable medium, storing computer-executable instructions, the computer-executable instructions, when being executed, causing at least one processor to perform one or more of the methods described herein.

DETAILED DESCRIPTION

Accordingly, in various embodiments of the present disclosure, an input node and an output node of the AI model may be analytically obtained, and once the output node is determined, a data format of the node may be analytically obtained. For example, the number of integer variables required by the node may be known. Based on this, an output format of a model file may be analyzed directly, and then an inference result may be packed according to the output format and sent to the PLC through a corresponding communication protocol. In the present invention, the PLC may also be helped to generate a program to receive packed data and perform parsing according to the analytically obtained format.

A data interaction mechanism for the AI inference device and the automation controller incorporating teachings of the present disclosure does not require an engineer to have rich programming experience and a strong programming ability or be particularly good at a certain programming language and AI knowledge, and the like. Data interaction is automatically performed, so that the work of program development and system integration and scheduling is reduced.

The present disclosure provides AI model analysis and visualization, and an engineer may understand the topological structure of the AI model and a user requirement better and determine analysis and data structures for creating the data format for data interaction. The present teachings also provide a unified operating environment and data format to eliminate differences among the AI model, the PLC and the communication protocol, and the data format may be created by programming-free dragging operations to perform data interaction.

Specific implementations of the present invention are described below with reference to the accompanying drawings. All programs can be generated automatically according to required protocols/languages without additional development, and AI engineers and automation engineers also do not need to get familiar with the languages of each other.

Particularly, the teachings of the present disclosure may also provide function modules and components supporting for communication between an AI inference device and an automation controller. The structure of an inference result may be analyzed and visualized to make it easy for AI engineers, automation engineers or other engineers with AI knowledge to understand, and then an expected inference result is mapped to a PLC by a simple dragging operation through a graphical tool. Particularly, communication protocols and source codes of function modules of the inference device and the PLC may be established and generated. Therefore, AI engineers or automation engineers with enough technical backgrounds may also perform the foregoing process.

Figure 1:
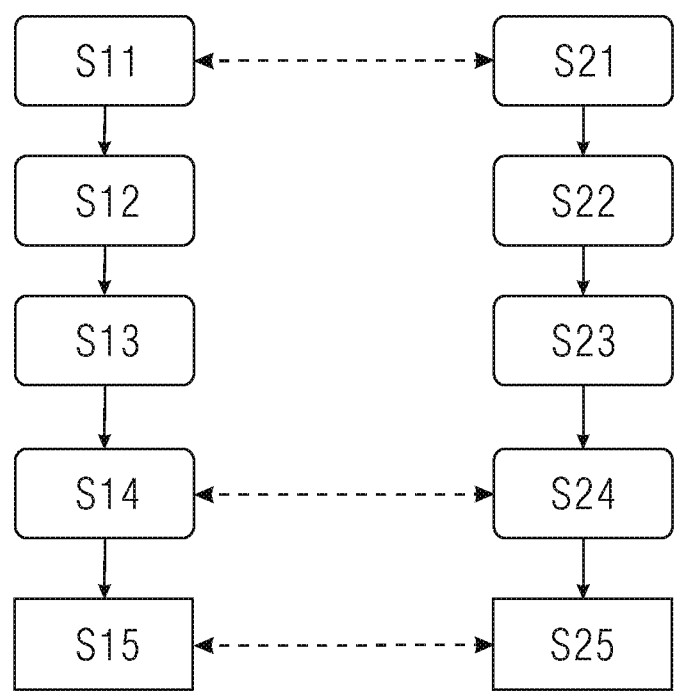
FIG. 1 is a flowchart showing an example data interaction method for an AI inference device and an automation controller according to the prior art.

FIG. 1 is a flowchart showing a data interaction method for an AI inference device and an automation controller according to the prior art. The left in FIG. 1 is the AI inference device, and the right in FIG. 1 is the automation controller. Particularly, the AI inference device is an edge device, and the automation controller is a PLC.

In this method, an AI engineer needs to confirm an output of an AI model, a communication protocol and a data type, such that the AI engineer negotiates with an automation engineer to define a business-logic-based communication protocol S11/S21. Then, the AI engineer and the automation engineer program using a language corresponding to the protocol S12/S22. For example, the edge device uses python/CPP, while the PLC uses SCL/LAD. Next, the AI engineer and the automation engineer perform program construction and downloading S13/S23. Then, the AI engineer and the automation engineer communicate with each other to perform system integration and debugging S14/S24 to obtain a stable program. Finally, the edge device and the PLC perform data exchange and runtime interaction, namely the edge device sends an inference result to the automation controller S15 and the automation controller feeds back a result to the edge device S25. The foregoing steps are iteratively executed.

However, programming required by loading the model for inference in the edge device needs to be different from the PLC, and if it is the automation engineer responsible for developing a code for loading the model for inference in the edge device, a new programming language is required to be learned. Next, the format of the inference result obtained in the edge device varies with different models, and data cannot be sent to the PLC by the edge device in a standard manner. Finally, since the format of the inference result varies with different models, the PLC parses the received inference result and can use the inference result correctly only after correct parsing. The AI engineer and the automation engineer also need to agree on a format. Therefore, the AI engineer and the automation engineer work respectively, also need to interact frequently, and are familiar with respective fields, resulting in high workload and error rate.

In addition, there are some other factors making the foregoing problems more complex. For example, the edge device may use different programming languages which may be not python but C, C++ and JAVA, with no limits made thereto, so that the AI engineer of the edge device is required to be familiar with different languages. It cannot ensure that communication between the edge device and the PLC is always standard communication (such as Ethernet and PROFINET), and the communication protocol for the edge device and the PLC varies with different application scenarios, so that the inference result needs to be sent through different protocols, and interfaces of different protocols are required to be called for packing. This means that the AI engineer sends the data according to different protocols. For example, one edge cooperates with two different PLCs, one protocol is PROFIBUS, and the other protocol is PROFINET. In such a case, the AI engineer needs to call different protocols, further increasing the complexity and the workload.

Figure 2:
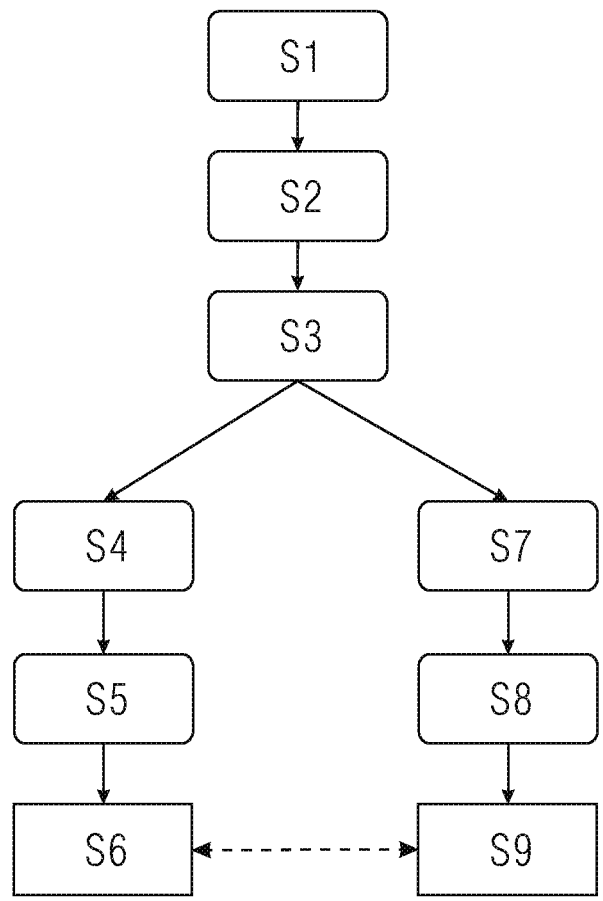
FIG. 2 is a flowchart showing an example data interaction method for an AI inference device and an automation controller incorporating teachings of the disclosure.

FIG. 2 is a flowchart showing a data interaction method for an AI inference device and an automation controller incorporating teachings of the present disclosure. As shown in FIG. 2, the example data interaction method uses an AI inference device and an automation controller. Step S1, step S2, and step S3 may be executed at the AI inference device and/or the automation controller, step S4, step S5, and step S6 are executed at the AI inference device, and step S7, step S8, and step S9 are executed at the automation controller. In some embodiments, the AI inference device is an edge device, and the automation controller is a PLC.

Some data interaction methods for an AI inference device and an automation controller, which includes step S1 is executed: a topological structure of an AI model is analyzed, and multiple nodes of the AI model and interconnections of the multiple nodes are acquired.

Figure 3:
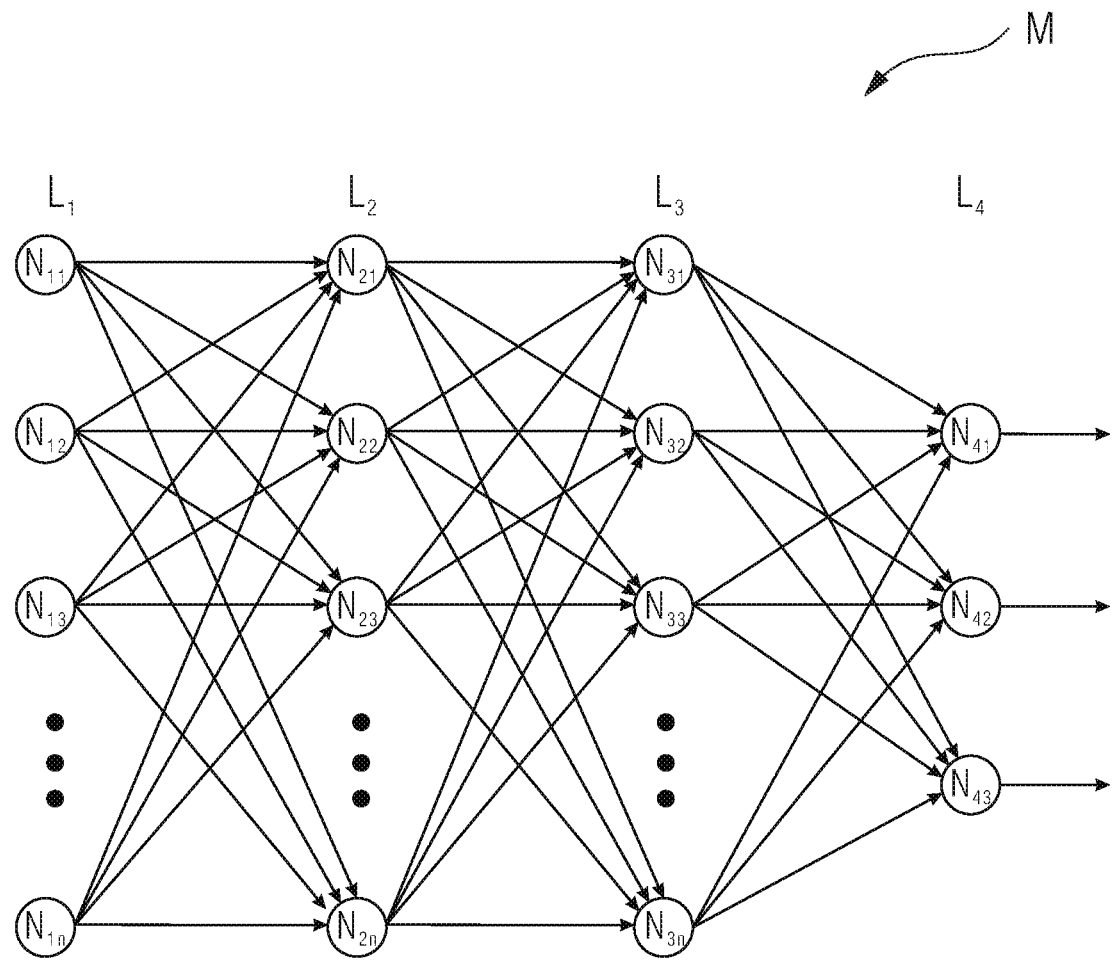
FIG. 3 is a schematic diagram showing a topological structure of an AI model incorporating teachings of the present disclosure.

Specifically, as shown in FIG. 3, the topological structure of the AI model M includes multiple nodes. The nodes of the AI model M include a first layer $L_1$, a second layer $L_2$, a third layer $L_3$, and a fourth layer $L_4$. Specifically, the first layer $L_1$ includes a first node $N_{11}$, a second node $N_{12}$, a third node $N_{13}$ . . . , and an nth node $N_{1n}$; the second layer $L_2$ includes a first node $N_{21}$, a second node $N_{22}$, a third node $N_{23}$ . . . , and an nth node $N_{2n}$; the third layer $L_3$ includes a first node $N_{31}$, a second node $N_{32}$, a third node $N_{33}$ . . . , and an nth node $N_{3n}$; and the fourth layer $L_4$ includes a first node $N_{41}$, a second node $N_{42}$, and a third node $N_{43}$. Therefore, an interconnection relationship of the nodes is obtained by analysis in step S31, the first node $N_{11}$, the second node $N_{12}$ and the third node $N_{13}$ of the first layer $L_1$ of the nodes are input nodes, and the first node $N_{41}$, the second node $N_{42}$ and the third node $N_{43}$ of the fourth layer $L_4$ are output nodes.

This provides analysis and visualization of the topology of the AI model for a user, including input and output tensors. Based on a visualization result, the user can understand an inference process better and further specify an expected inference result exchanged with the PLC easily, so as to increase intelligent functions of the automation controller.

Then, step S2 includes: an output node of the AI model is matched based on a user input, a format of an inference result is determined based on the AI model, and the format of the inference result is mapped to the automation controller. In some embodiments, Step S2 further includes: the output node of the AI model is matched based on the user input, the format of the inference result is determined based on the AI model, and the format of the inference result is mapped to an input image of the PLC. The above step provides the format defined for the input image of the PLC for the user and connects the inference result to an inference result of the input image.

As shown in FIG. 3, for example, the matched output node of the AI model is the first node $N_{11}$ of the first layer $L_1$, and the format of the inference result may be determined based on a format of the AI model, so that the format of the inference result may be mapped to the input image, serving as an input data storage space, of the PLC.

Finally, step S3 includes: a communication protocol for performing data interaction by the AI inference device and the automation controller is matched based on the user input.

The methods and systems described herein may be used to automatically generate all programs according to a required protocol/language without development and make it unnecessary for AI and automation engineers to get familiar with languages of each other. The communication protocol of the PLC is an underlying communication protocol thereof, for example, including PROFIBUS/PROFINET, and it is only necessary to determine the communication protocol for performing data interaction in step S3 to generate a code program corresponding to the communication protocol. In addition, after the communication protocol for data interaction is determined, it is only necessary to determine a programming language used by the edge device based on the user input, for example, C/C++/JAVA is used to generate the program. Moreover, the format for data interaction between the edge device and the PLC may be analyzed, and then code programs of the edge device and the PLC are generated according to the format. The output format of a model file is analyzed directly, and then the inference result may be packed according to the output format and sent to the PLC through the corresponding communication protocol. The PLC may also be helped to generate a program to receive packed data and perform parsing according to the analytically obtained format. Therefore, the workload of performing data interaction of the AI inference device and the automation controller can be reduced, and the AI engineer and the automation engineer can communicate less and do not need to get familiar with different programming languages as well as underlying communication protocols of each other.

In some embodiments, the data interaction method further includes S4, S5 and S6 executed at the edge device. In step S4, a first source code is generated for the edge device based on the format of the inference result, a format of the communication protocol and a runtime environment of the inference device. A runtime system of the edge device is Windows10, a processor is X86_64, the programming language is Python, an Internet Protocol (IP) address is 192.168.1.10, and the communication protocol is PROFINET.

Specifically, the configured items of the inference device are used to configure parameters about a runtime environment of the inference device to generate the first source code of the inference device. The processor is a processor used by the inference device, the programming language is a programming language source code generated by the inference device, and the IP address is an IP address for communication of the PLC.

In step S5, the first source code is downloaded to the AI inference device. In step S6, the inference result is packed using the first source code based on the format of the inference result, and the packed inference result is sent to the automation controller through the matched communication protocol.

In some embodiments, the data interaction method further includes step S7, step S8 and step S9 executed at the PLC. At first, step S7 is executed: a second source code is generated for the automation controller based on the format of the inference result, the format of the communication protocol and a runtime environment of the automation controller. The supplier of the PLC is Siemens, the PLC is S7-1500, an IP address is 192.168.1.20, and the communication protocol is PROFINET. Specifically, the PLC is used for connection to the inference device, and the IP address is a device used by the PLC to communicate with the inference device.

An inference output region is used to visualize details of a data structure. Data processing, such as data interaction with the PLC and storage of the inference result, may be determined to be performed in the data structure. An inference output is analytically obtained from the AI model, and determines establishment time of the AI model. For example, when classification is performed, the inference output is a classification target of the AI model. Each output item may include one or more data items about the AI model. For example, when classification is performed, an item includes only one piece of floating data, i.e., the possibility of a target. For another example, when target detection is performed, an item usually includes seven pieces of floating data, such a target possibility and a position. An input and output of the PLC may determine the number of items that can be transmitted to the PLC to execute an automation system, and in addition, a unified data type is required to be dragged from a related unified data type region to construct an image structure.

In step S8, the second source code is downloaded to the automation controller. In step S9, the automation controller is controlled to receive and parse the inference result to send a feedback result to the AI inference device. In some embodiments, the data interaction method further includes the following steps: the AI inference device performs inference on the AI model according to input data, and an inference result includes multiple pieces of output data and multiple corresponding parameters; and the automation controller reads the inference result, selects part of the output data and the corresponding parameters from the inference result and performs association and mapping according to the selected output data and corresponding parameters.

Inference refers to obtaining an inference result for input data of the AI model, and the inference result includes multiple pieces of output data and each piece of output data includes multiple parameters. For example, the matched output node of the AI model is the first node $N_{11}$ of the first layer $L_1$, and includes 100 pieces of output data, each piece of output data includes parameters INT32, FP16, FP16, FP16, FP16, FP16, FP16 and FP16. However, not all the data and parameters thereof sent to the PLC by the first node $N_{11}$ are needed by the PLC, and the PLC usually needs a part of or a few pieces of data and parameters thereof in the data and parameters thereof output by the node only. In the present embodiment, the PLC only needs five parameters INT32, FP16, FP16, FP16 and FP16, where INT32 is associated and mapped to INT32: Index of the PLC, FP16 is associated and mapped to FP32: Left_Top_X of the PLC, FP16 is associated and mapped to FP32: Left_Top_Y of the PLC, FP16 is associated and mapped to FP32: Right_Bottom_X of the PLC, and FP16 is associated and mapped to FP32: Right_Bottom_Y of the PLC.

Accordingly, when the format for data interaction of the edge device and the PLC is specified, the format of the inference result is determined, not all the inference result of the model is needed by the PLC, and the PLC only needs a part. In such cases, the foregoing specification process is required, the PLC needs some data for interaction and some for data processing, and this is also a process that the PLC extracts desired contents.

In some embodiments, the data interaction method further includes performing translation on the AI inference device and the automation controller based on different programming languages corresponding to different communication protocols to unify types of the different programming languages. Specifically, different types of devices correspond to different protocols and different programming languages and define different data types. For example, an integer is defined to be four bytes in some devices but two bytes in some others, and some are called int, int32, and INT32. In the present step, the data types are unified, and translation is performed according to different languages to unify the data types. For supporting different inference devices, communication protocols and PLCs, the present step defines a unified data type that may be mapped to data types defined by the communication protocol and the PLC, so that development processes of the engineers in different automation systems can be avoided.

In some embodiments, the data interaction method further includes performing program construction on the first source code and the second source code to convert the first source code and the second source code into a binary code. In the present step, program construction is performed to convert the source codes into the binary code, thereby constructing an executable binary code for the edge device and the PLC to read data for data interaction. The corresponding communication protocol is matched based on the user input, and different communication protocols call different libraries. The communication protocol includes PROFINET, EtherCAT, Modbus and the like. Therefore, programming of the inference device is required to be based on programming of the PLC, and then programming is required to be performed based on the programming language and interface related to the communication protocol. By contrast, in the prior art, any engineer needs to learn this programming language first.

Some embodiments include a data interaction system for an AI inference device and an automation controller, which includes: a processor; and a memory coupled to the processor. The memory has an instruction stored therein, when the instruction is executed by the processor, an electronic device is enabled to execute operations, and the operations include: S1: a topological structure of an AI model is analyzed, and multiple nodes of the AI model and interconnections of the multiple nodes are acquired; S2: an output node of the AI model is matched based on a user input, a format of an inference result is determined based on the AI model, and the format of the inference result is mapped to the automation controller; and S3: a communication protocol for performing data interaction by the AI inference device and the automation controller is matched based on the user input.

In some embodiments, the AI inference device is an edge device, and the automation controller is a PLC.

In some embodiments, the operation S2 further includes: the output node of the AI model is matched based on the user input, the format of the inference result is determined based on the AI model, and the format of the inference result is mapped to an input image of the PLC.

In some embodiments, the operations further include: S4: a first source code is generated for the edge device based on the format of the inference result, a format of the communication protocol and a runtime environment of the inference device; S5: the first source code is downloaded to the AI inference device; and S6: the inference result is packed using the first source code based on the format of the inference result, and the packed inference result is sent to the automation controller through the matched communication protocol.

In some embodiments, the operations further include: a second source code is generated for the automation controller based on the format of the inference result, the format of the communication protocol and a runtime environment of the automation controller; the second source code is downloaded to the automation controller; and the automation controller is controlled to receive and parse the inference result to send a feedback result to the AI inference device.

In some embodiments, the operations further include: the AI inference device performs inference on the AI model according to input data, and an inference result includes multiple pieces of output data and multiple corresponding parameters; and the automation controller reads the inference result, selects part of the output data and the corresponding parameters from the inference result and performs association and mapping according to the selected output data and corresponding parameters.

In some embodiments, the operations further include: translation is performed on the AI inference device and the automation controller based on different programming languages corresponding to different communication protocols to unify types of the different programming languages.

In some embodiments, the operations further include: program construction is performed on the first source code and the second source code to convert the first source code and the second source code into a binary code.

As another example, some embodiments include a data interaction apparatus for an AI inference device and an automation controller, which includes the following: an analysis apparatus, configured to analyze a topological structure of an AI model and acquire multiple nodes of the AI model and interconnections of the multiple nodes; a matching and mapping apparatus, configured to match an output node of the AI model based on a user input, determine a format of an inference result based on the AI model and map the format of the inference result to the automation controller; and a matching apparatus, configured to match a communication protocol for performing data interaction by the AI inference device and the automation controller based on the user input.

As another example, some embodiments include a computer program product stored on a non-transitory computer-readable medium and includes computer-executable instructions, the computer-executable instructions, when being executed, causing at least one processor to perform one or more of the methods described.

As another example, some embodiments include a computer-readable medium, storing computer-executable instructions, the computer-executable instructions, when being executed, causing at least one processor to perform one or more of the methods described herein.

An input node and an output node of the AI model may be analytically obtained, and once the output node is determined, a data format of the node may be analytically obtained. For example, the number of integer variables required by the node may be known. Based on this, an output format of a model file may be analyzed directly, and then an inference result may be packed according to the output format and sent to the PLC through a corresponding communication protocol. In the present invention, the PLC may also be helped to generate a program to receive packed data and perform parsing according to the analytically obtained format.

A data interaction mechanism for the AI inference device and the automation controller does not require an engineer to have rich programming experience and a strong programming ability or be particularly good at a certain programming language and AI knowledge, and the like. Instead, data interaction is automatically performed, so that the work of system integration and scheduling is reduced.

The teachings of the present disclosure provide AI model analysis and visualization, and an engineer may understand the topological structure of the AI model and a user requirement better and determine analysis and data structures for creating the data format for data interaction. This also provides a unified operating environment and data format to eliminate differences among the AI model, the PLC and the communication protocol, and the data format may be created by programming-free dragging operations to perform data interaction.

Although the teachings of the present disclosure has been described in detail through the above exemplary embodiments, it should be understood that the above description should not be considered as a limitation on the present disclosure. For a person skilled in the art, various modifications and replacements will be apparent after reading the above content. Therefore, the protection scope of the present disclosure should be subject to the appended claims. In addition, any reference numeral in the claims shall not be construed as limiting the claims; the word "include/comprise" does not exclude apparatuses or steps not listed in other claims or the specification; and the terms such as "first" and "second" are only used for indicating the names and do not indicate any particular order.

What is claimed is:

1. A data interaction method for an Artificial Intelligence (AI) inference device and an automation controller, the method comprising:
   S1: analyzing a topological structure of an AI model, and acquiring multiple nodes of the AI model and interconnections of the multiple nodes;
   S2: matching an output node of the AI model based on a user input, determining a format of an inference result based on the AI model, and mapping the format of the inference result to the automation controller; and
   S3: matching a communication protocol for performing data interaction by the AI inference device and the automation controller based on the user input.

2. The data interaction method according to claim 1, wherein:
   the AI inference device comprises an edge device; and
   the automation controller comprises a Programmable Logic Controller (PLC).

3. The data interaction method according to claim 2, wherein S2 further comprises:
   matching the output node of the AI model based on the user input;
   determining the format of the inference result based on the AI model; and
   mapping the format of the inference result to an input image of the PLC.

4. The data interaction method according to claim 1, further comprising the following executed at the AI inference device:
   S4: generating a first source code for the edge device based on the format of the inference result, a format of the communication protocol, and a runtime environment of the inference device;
   S5: downloading the first source code to the AI inference device; and
   S6: packing the inference result using the first source code based on the format of the inference result and sending the packed inference result to the automation controller through the matched communication protocol.

5. The data interaction method according to claim 1, further comprising the following executed at the automation controller:
   S7: generating a second source code for the automation controller based on the format of the inference result, a format of the communication protocol and a runtime environment of the automation controller;
   S8: downloading the second source code to the automation controller; and
   S9: controlling the automation controller to receive and parse the inference result to send a feedback result to the AI inference device.

6. The data interaction method according to claim 4, further comprising:
   performing, by the AI inference device, inference on the AI model according to input data, wherein an inference result comprises multiple pieces of output data and multiple corresponding parameters; and
   reading, by the automation controller, the inference result, selecting part of the output data and the corresponding parameters from the inference result, and performing association and mapping according to the selected output data and corresponding parameters.

7. The data interaction method according to claim 4, further comprising
   performing translation on the AI inference device and the automation controller based on different programming languages corresponding to different communication protocols to unify types of the different programming languages.

8. The data interaction method according to claim 4, further comprising performing program construction on the first source code and the second source code to convert the first source code and the second source code into a binary code.

9. A data interaction system for an Artificial Intelligence (AI) inference device and an automation controller, the system comprising:
   a processor; and
   a memory coupled to the processor, the memory having instructions stored therein, the instructions, when executed by the processor, causing the processor to:
   S1: analyze a topological structure of an AI model, and acquiring multiple nodes of the AI model and interconnections of the multiple nodes;
   S2: match an output node of the AI model based on a user input, determining a format of an inference result based on the AI model, and mapping the format of the inference result to the automation controller; and S3: match a communication protocol for performing data interaction by the AI inference device and the automation controller based on the user input.

10. The data interaction system according to claim 9, wherein:
the AI inference device comprises an edge device; and
the automation controller comprises a Programmable Logic Controller (PLC).

11. The data interaction system according to claim 10, wherein the operation S2 further comprises:
matching the output node of the AI model based on the user input;
determining the format of the inference result based on the AI model; and
mapping the format of the inference result to an input image of the PLC.

12. The data interaction system according to claim 9, wherein the instructions further comprise:
S4: generate a first source code for the edge device based on the format of the inference result, a format of the communication protocol and a runtime environment of the inference device;
S5: download the first source code to the AI inference device; and
S6: pack the inference result using the first source code based on the format of the inference result, and sending the packed inference result to the automation controller through the matched communication protocol.

13. The data interaction system according to claim 9, wherein the instructions further comprise:
S7: generating a second source code for the automation controller based on the format of the inference result, a format of the communication protocol and a runtime environment of the automation controller;
S8: downloading the second source code to the automation controller; and
S9: controlling the automation controller to receive and parse the inference result to send a feedback result to the AI inference device.

14. The data interaction system according to claim 12, wherein the instructions further comprise:
performing, by the AI inference device, inference on the AI model according to input data, wherein an inference result comprises multiple pieces of output data and multiple corresponding parameters; and
reading, by the automation controller, the inference result, selecting part of the output data and the corresponding parameters from the inference result, and performing association and mapping according to the selected output data and corresponding parameters.

15. The data interaction system according to claim 12, wherein the instructions further comprise
performing translation on the AI inference device and the automation controller based on different programming languages corresponding to different communication protocols to unify types of the different programming languages.

16. The data interaction system according to claim 12, wherein the instructions further comprise performing program construction on the first source code and the second source code to convert the first source code and the second source code into a binary code.

17. A data interaction apparatus for an Artificial Intelligence (AI) inference device and an automation controller, the apparatus comprising:
an analysis module configured to analyze a topological structure of an AI model and acquire multiple nodes of the AI model and interconnections of the multiple nodes;
a matching and mapping module configured to match an output node of the AI model based on a user input, determine a format of an inference result based on the AI model and map the format of the inference result to the automation controller; and
a matching module configured to match a communication protocol for performing data interaction by the AI inference device and the automation controller based on the user input.

18. A non-transitory computer-readable medium storing computer-executable instructions, the computer-executable instructions, when being executed, causing at least one processor to
S1: analyze a topological structure of an AI model, and acquiring multiple nodes of the AI model and interconnections of the multiple nodes;
S2: match an output node of the AI model based on a user input, determining a format of an inference result based on the AI model, and mapping the format of the inference result to the automation controller; and
S3: match a communication protocol for performing data interaction by the AI inference device and the automation controller based on the user input.

* * * * *